Dec. 25, 1951     G. L. WHITE     2,580,145
ATTACHMENT FOR CONTROLLING WEEDS IN COTTON
Filed June 6, 1949     3 Sheets-Sheet 2
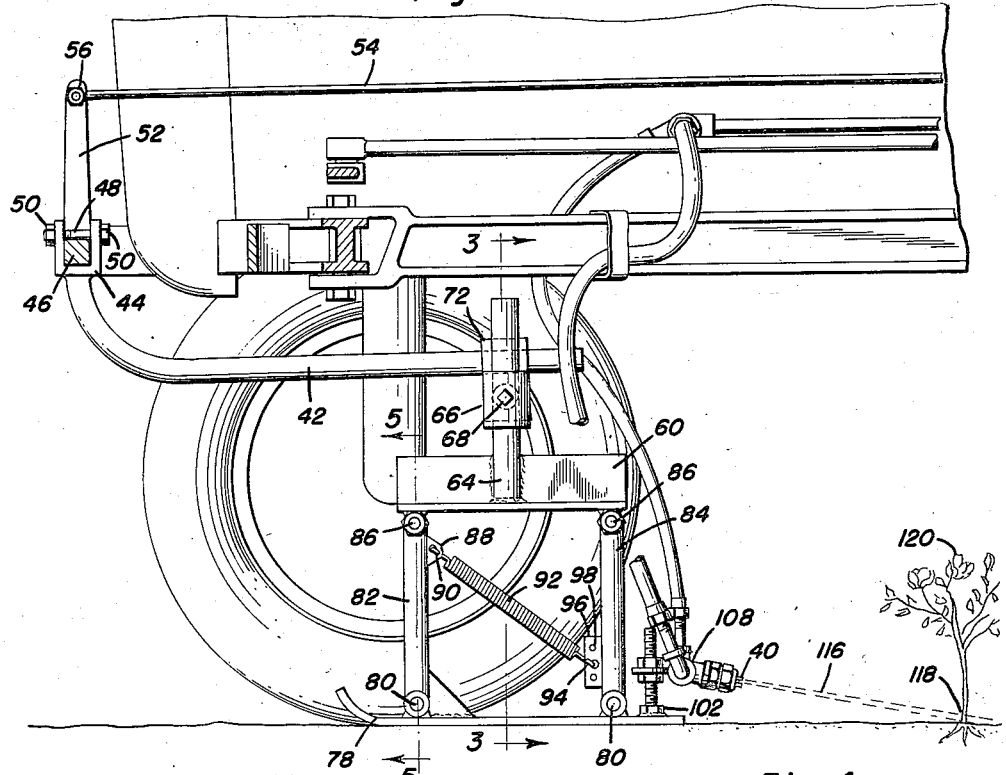
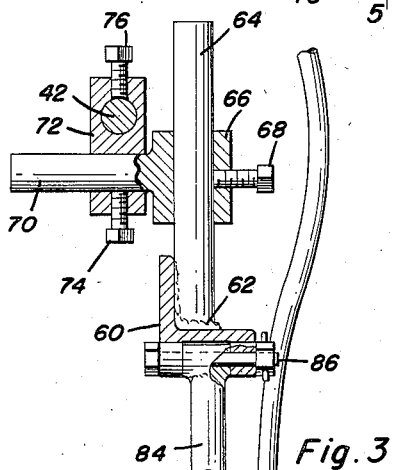
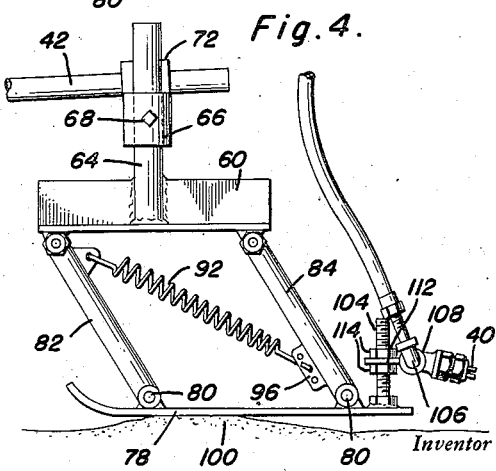
Inventor
Godfrey L. White
By Clarence A. O'Brien
and Harvey B. Jacobson
Attorneys

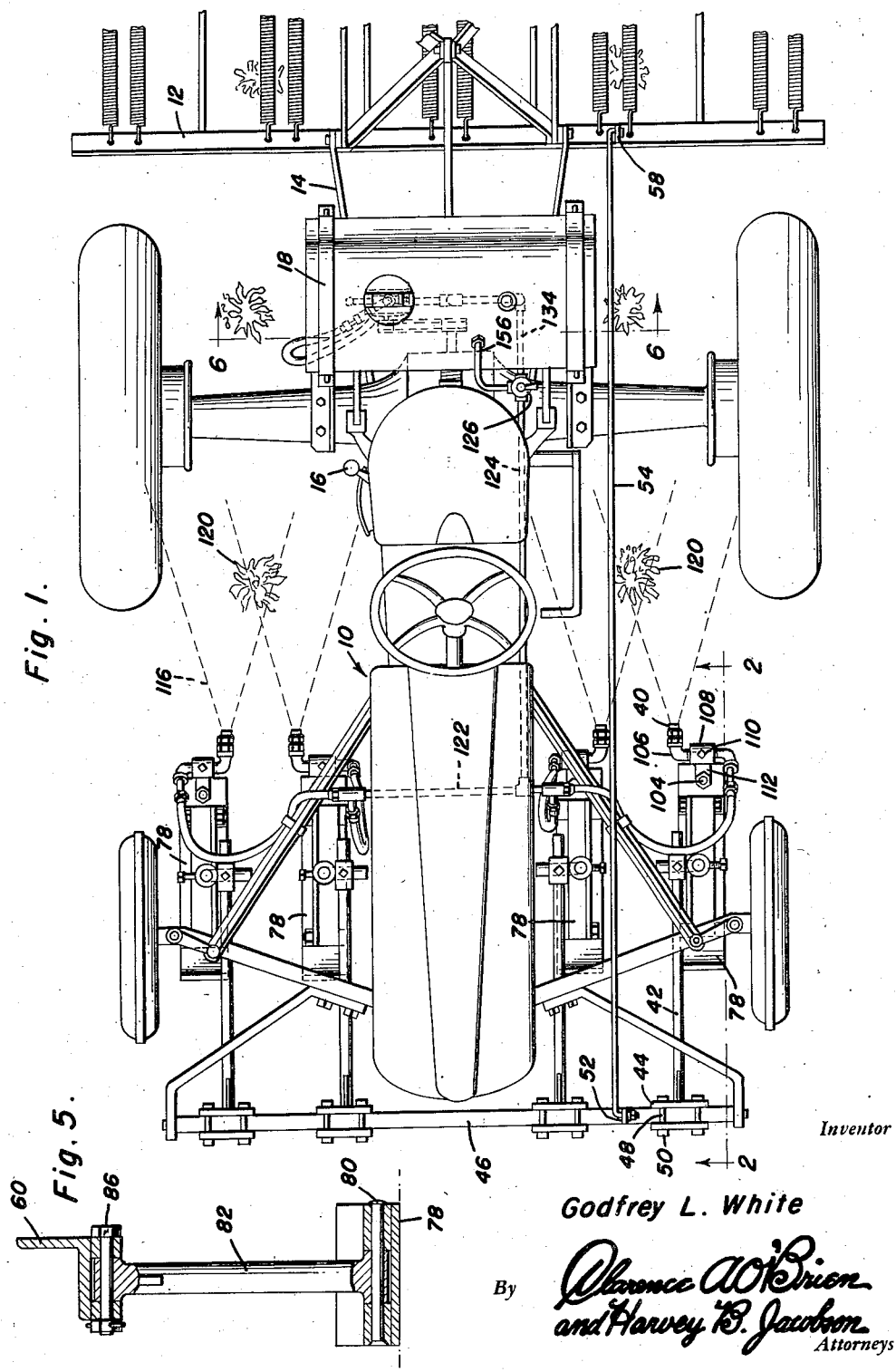

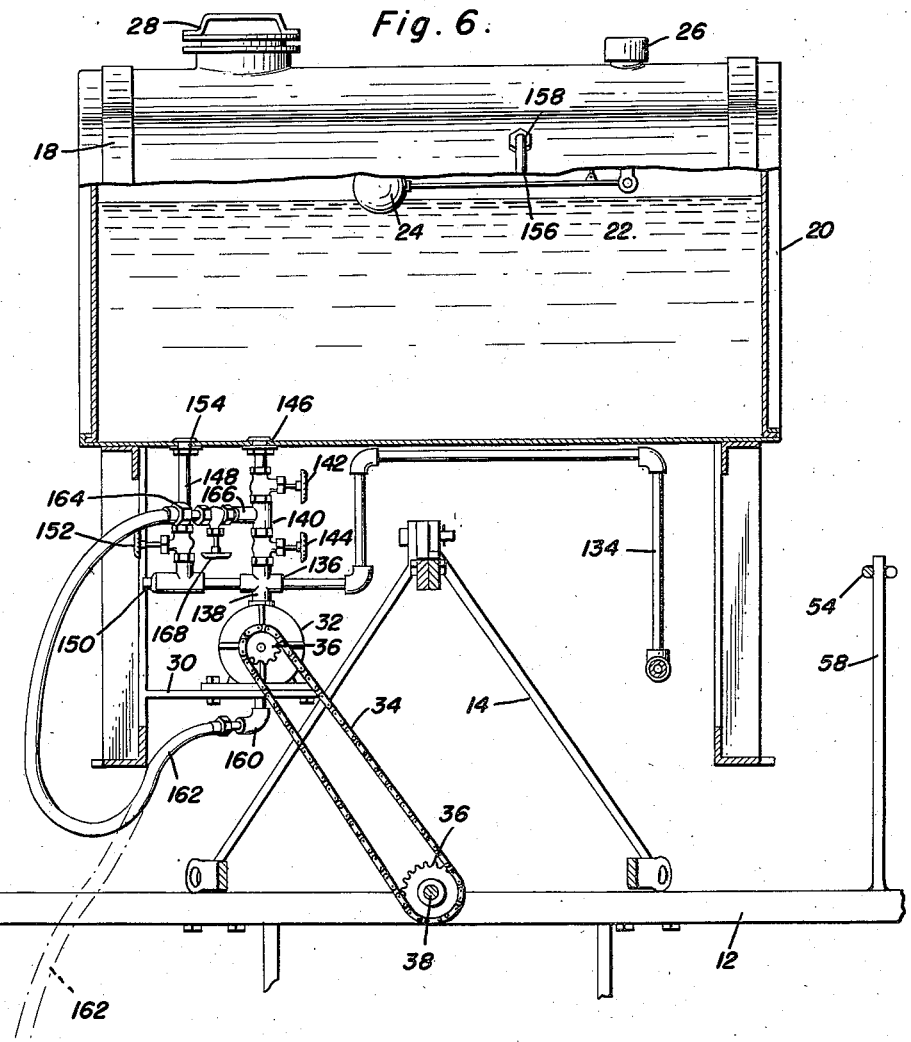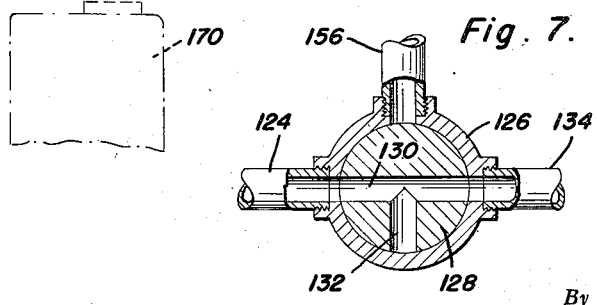

Patented Dec. 25, 1951

2,580,145

UNITED STATES PATENT OFFICE 2,580,145

ATTACHMENT FOR CONTROLLING WEEDS IN COTTON

Godfrey L. White, Osceola, Ark.

Application June 6, 1949, Serial No. 97,429

7 Claims. (Cl. 299—30)

1

This invention relates to an attachment for a prime mover such as a tractor for controlling weeds in cotton and represents an improvement on the apparatus set forth in applicant's Patent No. 2,501,555 which matured from co-pending application, Serial No. 788,102, filed November 26, 1947.

The primary object of this invention is to provide a spraying attachment for use with a prime mover to arrest and retard undesirable vegetation in cotton and similar crops by controlling the amount of herbicidal fluid applied, the pressure of the herbicidal fluid and the accurate placement of the same.

Inasmuch as certain herbicides are toxic not only to weeds but also to the cotton itself when sprayed on the leaves thereof, it becomes necessary to provide a spraying attachment or device which will at all times deliver the herbicide in controlled amounts and under controlled pressure to the undesirable vegetation or weeds and only to a restricted portion of the stems of the cotton plant. To this end, the present device has been conceived and includes novel means for effecting the necessary controls.

An important feature of this invention is to provide a pressure control for the herbicide which includes valved conduits in communication with a pump and an adjustable three-way by-pass valve in the conduits leading to the spray nozzles. The amount of the herbicide applied is controlled by means of maintaining constant pressure in the conduits and the size of the orifice in the spray nozzle that emits the spray in a fan-shaped pattern.

A very important feature of this invention is the provision of shoes or runners which are adjustably supported upon the prime mover and to which are attached adjustable spray nozzles. These shoes are supported upon the prime mover in such a manner that they are positioned on both sides of each row of cotton, the shoes maintaining contact with the ground by means of a spring which keeps them pulled down at all times and which also permits the shoes to slide over uneven terrain without upsetting the adjusted position of the spray nozzles thereon. These shoes permit the accurate placement of the herbicide in such a manner that obnoxious vegetation is eradicated successfully without damaging the cotton.

A further object of this invention is to provide in a tractor having a power take-off, a cultivator-supporting tool bar and a means for raising and lowering the tool bar; a means for spraying weeds comprising a reservoir carried by said tractor for retaining a herbicidal fluid, a pump driven by the power take-off, runners, support bars, means securing said support bars to the raising and lowering means on the tractor, means for pivotally securing said runners to said support bars, resilient means for retaining said runners at all times parallel to said support bars, spray nozzles, means for adjustably supporting

2 said spray nozzles upon said runners, valved conduit means connecting the suction end of said pump to said reservoir, and further valved conduit means connecting the pressure end of said pump to said spray nozzles.

These, together with various ancillary objects and features of the invention which will later become apparent as the following description proceeds, are attained by the device, a preferred embodiment of which has been illustrated, by way of example only, in the accompanying drawings, wherein:

Figure 1 is a top plan view of the entire attachment shown positioned on a Ford-Ferguson type tractor;

Figure 2 is a sectional view taken substantially on the plane of section line 2—2 of Figure 1;

Figure 3 is a sectional view taken substantially on the plane of section line 3—3 of Figure 2;

Figure 4 is a fragmentary side elevational view of a runner or shoe illustrating the position it assumes when travelling over a mound or hill;

Figure 5 is a sectional view taken substantially on the plane of section line 5—5 of Figure 2;

Figure 6 is a sectional view taken substantially on the plane of section line 6—6 of Figure 1; and Figure 7 is a fragmentary horizontal sectional view through the three-way valve.

Specific reference will now be made to the drawings. In the several views, in the accompanying drawings and in the following specification, similar reference characters indicate corresponding elements throughout.

Indicated generally at 10 is a prime mover, such as a Ford-Ferguson type tractor, to the rear of which is a transversely extending cultivator-supporting tool bar 12 suitably attached, as at 14, to a conventional hydraulic raising and lifting means (not shown) controlled by a conventional lever or actuating rod 16.

Carried on the tractor chassis adjacent the rear thereof, by any suitable means such as straps 18, is a reservoir or tank 20 for retaining a herbicidal fluid 22. The reservoir is provided with a conventional level control float valve 24, a pressure gauge 26, and a filling port and closure 28. Suitably supported upon a stand or ledge 30 is a conventional pump 32 driven by a suitable chain 34 and sprockets 36 from the power take-off 38 on the tractor. The pump is connected to the reservoir 20 and the spray nozzles 40 by valved conduit means to be described hereinafter.

Extending longitudinally of the front end of the tractor is a plurality of transversely spaced rods or bars 42, see Figures 1 and 2, which are arcuated at their forward ends and carry at these ends U-shaped bars 44 which receive a transversely extending bar 46. The transverse bar 46 is retained on the U-shaped bars 44 by means of suitable bolts 48 threaded at their ends to receive closure nuts 50. Suitably secured, as by welding or riveting, to the transverse bar 46 intermediate its ends, is an upstanding link 52 which is apertured at its free end to receive the hooked end of a longitudinally extending link or operating bar 54, the hooked end of the rod being threaded to receive a nut 56 to retain the rod on the link 52. At its other end, the rod 54 is also hooked and received in an aperture of a second upstanding link 58 secured at its bottom end, as by welding or riveting, to the tool bar 12. Thus, it will be seen that the raising or lowering of the tool bar 12 will also raise or lower the longitudinal rods or bars 42.

Beneath each of the rods 42 is provided a longitudinally extending support bar 60, in the form preferably of an angle iron, and welded or riveted to the support bar, as at 62, is an upstanding rod 64 received in a collar 66 and retained in the collar by means of a suitable set screw 68. The collar 66 is provided with an integral extension 70 which extends through a retainer block 72, being held in the block by means of a suitable set screw 74. Also extending through the block 72 is the longitudinal rod or bar 42, the latter being retained in the block by means also of a suitable set screw 76. Thus, it will be seen that the supporting bar 60 may be adjustably raised or lowered with the rod 42 by the hydraulic means (not shown) conventionally provided in the tractor.

Runners or shoes 78 are provided, in the form of skees which carry the spray nozzles in a manner to be later described and which are pivotally secured to the supporting bars 60 in a manner to be described hereinafter. To each of the shoes 78 adjacent their ends is pivoted or hinged, as at 80, a pair of rods 82 and 84 which are, in turn, hinged or pivoted, as at 86, at their upper ends to the under side of the supporting bar 60. These rods 82 and 84, being parallel links, serve to maintain the shoes parallel to the supporting bar 60 at all times. A resilient means for urging the shoe 78 downwardly at all times is provided and consists of the following elements. An apertured ear 88 is welded or riveted to the rod 82 adjacent the supporting bar 60 and receives the hooked end 90 of a coil spring 92 which is further provided with a hook 94 at its other end. A bracket 96 is welded or riveted to the other rod 84 adjacent the shoe 78 and is provided with vertically spaced apertures 98 for selectively receiving the hook 94 to vary or adjust the tension in the spring 92. The spring is tensioned in such a manner as to keep the shoe 78 in contact at all times with the ground and when the shoe 78 strikes a mound or hill 100, as shown in Figure 4, the spring 92 extends and the rods 82 and 84 pivot on all their pivot points so that the shoe 78 remains substantially parallel to the supporting bar 60.

Secured by means of a suitable collar 102 to the rear end of each shoe 78 is an upstanding threaded bolt 104. Each spraying nozzle 40 is provided with a coupling or elbow 106 which extends through a collar 108 and is retained in the collar in any adjusted position by means of a set screw 110. The collar 108 carries an apertured lug 112 which is engaged on the threaded bolt 104 and retained in vertically adjusted position thereon by means of suitable threaded nuts 114 on both sides of the lug 112. Thus, it will be seen that the height of the spray nozzle 40 may be readily adjusted upon the runner or shoe 78 and the angular position of the spray nozzle may also be adjusted within the collar 108 by merely resetting the set screw 110. At this point it should be mentioned that the shoes 78 and associated spray nozzles 40 are positioned on both sides of the rows of cotton so that a somewhat overlapping fan-like spray of herbicide 116 will be deposited upon a restricted lower portion of the stem 118 of the cotton plants 120.

To control the quantity and pressure of the herbicidal fluid 22 to be delivered to the spray nozzles 40, a novel conduit means is provided and will now be described. Interconnecting all of the nozzles 40 and suitably suspended upon the tractor chassis is a conduit 122 suitably coupled to a longitudinally extending conduit 124 entering one branch of a valve casing 126 in which is positioned a manually operable, rotatable, three-way valve 128 having a diametrically extending bore 130 and a radially extending bore 132 perpendicular to and communicative with the first bore 130. Communicative with the valve casing 126 and diametrically opposite the conduit 124 is another conduit 134 which is attached at its free end to a four-way coupling 136 having one of its branches 138 secured to the pressure end of the pump 32. A further conduit 140 having two manually operable valves 142 and 144 is terminally secured to another branch of the coupling 136 and communicates with the reservoir 20 through a suitable aperture in the bottom wall thereof, as at 146. The remaining branch of the coupling 136 is attached to a further conduit 148 having a conventional relief valve 150 therein and a manually operable valve 152, the conduit 148 communicating with the reservoir 20 through a suitable aperture in the bottom wall thereof, as at 154. A further return conduit 156 is secured at one end to the valve casing 126 at a point midway between the attachment of the conduits 124 and 134 to the valve casing and leads to the reservoir 20 through a suitable aperture in a side wall thereof adjacent the top, as at 158. Secured as by a suitable coupling 160 to the suction end of the pump 32 is a flexible hose 162 which is detachably secured, as at 164, to a conduit 166 having a manually operable valve 168 therein, the conduit 166 being communicative with the conduit 140.

In practical operation, the attachment of the instant invention is assembled upon a prime mover such as a tractor 10 in a manner which will be readily apparent from the drawings, the nozzle 40 being adjusted to the proper height and angle upon each of the runners or shoes 78 so that the spray 116 of the herbicidal fluid will impinge on the obnoxious weeds and only on the restricted bottom portion 118 of the stem. The spray nozzle 40 being conventional, it will be readily understood that the volume of herbicidal fluid emitted from the nozzle may be readily controlled. By virtue of the pivotal interconnection between the shoes 78 and the supporting bar 60 and the resilient means or coil springs 92, it will be readily seen that the relative position of the spray nozzles 40 will remain constant as the shoes ride over mounds or hills 100. To fill the reservoir 20 from a suitable container 170, the flexible hose 162 is disconnected from the conduit 166 and positioned in the container 170. The pump 32 being driven by the power take-off 38 of the tractor will suck fluid through the flexible conduit 162. By closing the valves 152, 168, and the three-way valve 128, and by opening the valves 142 and 144 in the conduit 140, it will be readily understood that the herbicidal fluid will be pumped directly through the conduit 140 into the reservoir 20. When it is desired to deliver the fluid to the spray nozzles 40, the flexible hose 162 is attached, as at 164, to the conduit 166. The valves 144 and 152 are closed while the valves 168 and 142 remain open and the three-way valve 128 is opened to the position shown in Figure 7. The pump 32 then delivers fluid from the aperture 146 through the conduit 162, through the coupling 136, thence through the conduit 134, through the bore 130 in the valve 128, and finally through the conduit 124 to the spray nozzles 40. When the pressure in the lines exceeds that desired for the spraying of the fluid, the valve 152 can be adjustably cocked so that the fluid will pass not only through the conduit 34 but through the conduit 148 and back into the reservoir 20, thus releasing the pressure in the conduit 134. The relief valve 150 is provided in the conduit 148 for the eventuality that the pressure becomes entirely too great. In the normal operation of the spray valves 40, it becomes unnecessary to turn off the motor in the tractor and the associated pump, since the delivery of fluid to the spray nozzles 40 can be controlled by the manually operable three-way valve 128. When the valve is rotated so that the bore 132 registers with the conduit 124 and the bore 130 registers with the conduit 156, no fluid will be delivered to the spray nozzles 40 and slight suction in the line 156 will prevent any dripping from the nozzles. On the other hand, when the valve 128 is rotated so that the bore 132 registers with the conduit 134 and the bore 130 registers with the conduit 156, no fluid will be delivered to the spray nozzles 40, but instead the fluid will be pumped through the conduit 134 and the conduit 156 back to the reservoir 20.

Thus, it will be seen that a novel and extremely useful attachment is provided for controlling the pressure, quantity and placement of herbicidal fluid which is especially useful in eradicating obnoxious and undesired vegetation in cotton but which can be readily employed with such crops as beans, tomatoes, potatoes, roses, etc.

In view of the foregoing description taken in conjunction with the accompanying drawings, it is believed that a clear understanding of the device will be quite apparent to those skilled in this art. A more detailed description is accordingly deemed unnecessary.

It is to be understood, however, that even though there is herein shown and described a preferred embodiment of the invention, the same is susceptible to certain changes fully comprehended by the spirit of the invention as herein described and within the scope of the appended claims.

Having described the invention, what is claimed as new is:

1. In a tractor having a tool bar raising and lowering means; a weed spraying means comprising elongated support bars, means securing said support bars to said raising and lowering means whereby said support bars are longitudinal of the tractor and substantially parallel to the ground level, elongated runners, means pivotally securing said runners to said support bars for retaining said runners parallel to said support bars at all times, resilient means urging said runners into ground-engaging position, spray nozzles and means for supporting said spray nozzles upon said runners in adjusted vertical and angular positions relative to said runners.

2. In a tractor having a tool bar raising and lowering means; a weed spraying means comprising elongated support bars, means securing said support bars to said raising and lowering means whereby said support bars are longitudinal of the tractor and substantially parallel to the ground level, elongated runners, means pivotally securing said runners to said support bars for retaining said runners parallel to said support bars at all times, resilient means urging said runners into ground-engaging position, spray nozzles, means for supporting said spray nozzles upon said runners in adjusted vertical and angular positions relative to said runners, and means for delivering a herbicidal fluid under pressure to said spray nozzles.

3. The combination of claim 1 wherein said means for pivotally securing said runners to said support bars includes a pair of spaced vertically extending, parallel bars terminally pivoted to each of said runners and each of said support bars adjacent the ends of said support bars and runners.

4. The combination of claim 3 wherein said resilient means includes a coil spring secured at one of its ends to one bar of said pair of spaced bars adjacent said support bar and further secured at its other end to the other bar of said pair of spaced bars adjacent said runner.

5. In a spraying device, runners adapted to be connected to a cultivator tool bar on a tractor, spray nozzles, and means for supporting said spray nozzles on said runners in adjusted vertical and angular positions relative to said runners, said means comprising an upstanding threaded bolt secured at one end to each of said runners, a coupling carried by each of said spray nozzles, a collar for receiving said coupling, a set screw extending through said collar and adapted to engage said coupling to retain said nozzles in adjusted angular positions, an apertured lug carried by said collar and received on said threaded bolt, and threaded nuts engaging said bolt on both sides of said lug for retaining the latter in adjusted vertical position on said bolt.

6. In a spraying device, support bars adapted to be connected to a tractor, runners, spray nozzles carried by said runners, means pivotally securing said runners to said support bars for retaining said runners parallel to said support bars at all times, and resilient means urging said runners downwardly and into ground-engaging position, said first-named means including a pair of spaced, vertically extending, parallel bars terminally pivoted to each of said runners and each of said support bars adjacent the ends of said support bars and runners.

7. The combination of claim 6 wherein said resilient means includes a coil spring and means for terminally attaching said spring to each bar of said pair of spaced bars.

GODFREY L. WHITE.

REFERENCES CITED

The following references are of record in the file of this patent:

UNITED STATES PATENTS

| Number | Name | Date |
| --- | --- | --- |
| 668,950 | Brakeley | Feb. 26, 1901 |
| 1,348,038 | Neumeyer | July 27, 1920 |
| 1,656,171 | Cox | Jan. 17, 1928 |
| 1,970,984 | Smith | Aug. 21, 1934 |
| 2,109,384 | Gallupe | Feb. 22, 1938 |
| 2,336,577 | Singleton | Dec. 14, 1943 |
| 2,501,555 | White | Mar. 21, 1950 |

FOREIGN PATENTS

| Number | Country | Date |
| --- | --- | --- |
| 36,695 | Denmark | Oct. 11, 1926 |